United States Patent [19]

Perkins

[11] Patent Number: 4,586,394
[45] Date of Patent: May 6, 1986

[54] LOW NOISE LEAD SCREW POSITIONER

[75] Inventor: Gerald S. Perkins, Altadena, Calif.

[73] Assignee: The United States of America as represented by the Administrator of the National Aeronautics and Space Administration, Washington, D.C.

[21] Appl. No.: 403,849

[22] Filed: Jul. 30, 1982

[51] Int. Cl.[4] .................. F16H 1/18; F16H 1/20; F16H 27/02; F16H 29/02
[52] U.S. Cl. .................. 74/424.8 R; 74/89.15; 74/441; 74/458; 74/468
[58] Field of Search ............ 74/424.8 R, 89.15, 468, 74/441, 444, 467, 458

[56] References Cited

U.S. PATENT DOCUMENTS

| | | | |
|---|---|---|---|
| 3,171,295 | 3/1965 | Benckert | 74/424.8 R |
| 3,448,632 | 6/1969 | Rumbarger | 74/424.8 R |
| 3,454,136 | 7/1969 | Stark | 74/467 |
| 3,595,100 | 7/1971 | Stark et al. | 74/424.8 R |
| 3,651,706 | 3/1972 | Galbarini et al. | 74/467 |
| 4,148,227 | 4/1979 | Neugebauer | 74/467 |

FOREIGN PATENT DOCUMENTS

| | | | |
|---|---|---|---|
| 1550774 | 10/1969 | Fed. Rep. of Germany | 74/424.8 R |
| 1939706 | 2/1971 | Fed. Rep. of Germany | 74/424.8 R |
| 2821726 | 11/1979 | Fed. Rep. of Germany | 74/424.8 R |
| 94159 | 6/1982 | Japan | 74/424.8 R |
| 914165 | 12/1962 | United Kingdom | 74/468 |
| 1396711 | 6/1975 | United Kingdom | 74/424.8 R |
| 261849 | 1/1970 | U.S.S.R. | 74/424.8 R |
| 636439 | 12/1978 | U.S.S.R. | 74/424.8 R |
| 702196 | 12/1979 | U.S.S.R. | 74/467 |
| 756130 | 8/1980 | U.S.S.R. | 74/424.8 R |

Primary Examiner—Kenneth J. Dorner
Assistant Examiner—Mike Bednarek
Attorney, Agent, or Firm—Paul F. McCaul; Thomas H. Jones; John R. Manning

[57] ABSTRACT

A lead screw positioner (10) is described, which has extremely low noise, including a nut (12) lying about a lead screw (14) and means for flowing gas under pressure between the nut and screw to keep them slightly spaced. The nut forms a plenum chamber (34) which receives pressured air, and has several holes (32) leading from the chamber to the clearance space (20) between the nut and screw to apply pressured air thereto. The nut and screw are devoid of direct sealing contact, so the pressured gas flows from the holes and axially along the screw to the end of the nut, where the gas flows into the environment.

5 Claims, 3 Drawing Figures

LOW NOISE LEAD SCREW POSITIONER

ORIGIN OF THE INVENTION

The invention described herein was made in the performance of work under a NASA contract and is subject to the provisions of Section 305 of the National Aeronautics and Space Act of 1958, Public Law 85-568 (72 Stat. 435; 42 USC 2457).

BACKGROUND OF THE INVENTION

Some applications, such as the positioning of optical elements as in interferometry, require extremely precise positioning such as with an accuracy of less than one micrometer. A lead screw and nut can be constructed with the required precision, and with a very small clearance such as 0.0005 inch, and a number 5 (five microinch) machine finish on the mating threads. However, even such elements will not provide the required precision and uniformity, or lack of "noise", in movement of the optical element. A positioning apparatus which could provide extreme precision in the movement of a nut and with an extremely small level of "noise", or unpredictable small sudden movements, in a clean environment in which instruments are utilized, would be of considerable value.

SUMMARY OF THE INVENTION

In accordance with one embodiment of the present invention, a positioning apparatus is provided, which can position elements with extreme precision and very low noise, in an instrument environment. The apparatus includes a lead screw, a nut lying about the screw, and a means for flowing gas under pressure in the clearance space between the nut and screw. The pressured gas is applied to a location spaced from the ends of the nut, so that the gas can flow in an axial direction along the clearance space and from an end of the nut into the environment. The nut is provided with a plenum chamber into which pressured gas is pumped, and the nut has a group of very narrow holes that are circumferentially spaced about the nut, to carry pressured gas from the plenum chamber to different locations about the screw. The nut is free of seals or the like that would prevent the escape of gas into the environment. Instead, a very small clearance is provided between the nut and screw to minimize the flow of gas therealong, and the inert gas is allowed to freely flow into the environment.

The novel features of the invention are set forth with particularity in the appended claims. The invention will be best understood from the following description when read in conjunction with the accompanying drawings.

DESCRIPTION OF THE PREFERRED EMBODIMENT

Figure 1:
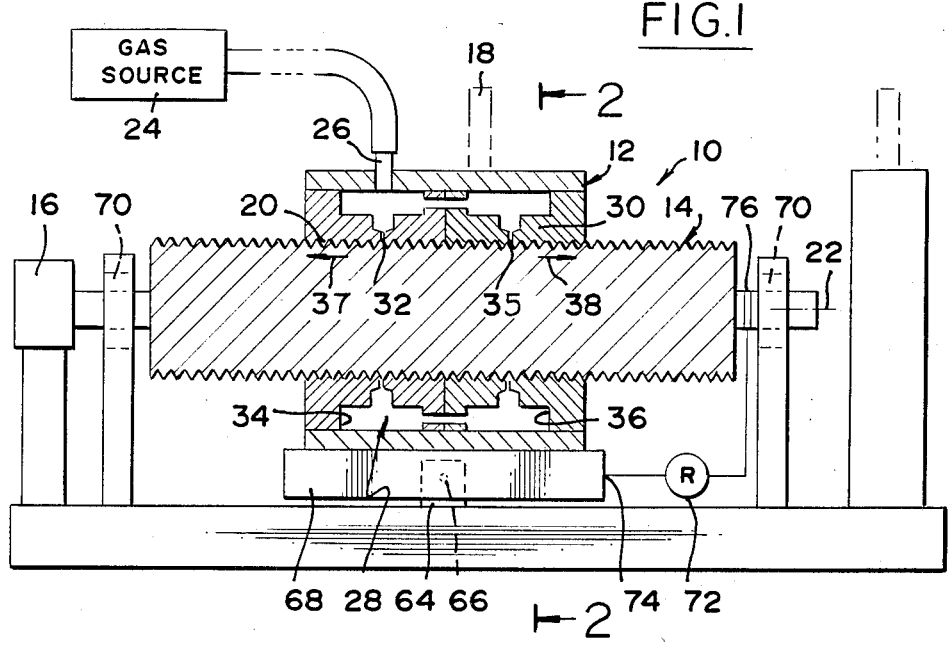
FIG. 1 is a sectional view of a positioning apparatus constructed in accordance with the present invention.

FIG. 1 shows a positioning apparatus 10 which includes a nut 12 lying about a lead screw 14 and a closely controllable motor 16 for rotating the lead screw. The nut 12 can be used to position an object with extreme precision, such as to position a retroreflector 18 in an interferometer system which analyzes radiation such as infrared radiation from the sun. In such applications, it is desirable to avoid even small irregular movements, which would occur in the case of precision nuts and lead screws that are in direct contact with one another. Small irregularities in the engaging surfaces can produce small irregular movements of the nut, such movements typically being referred to as "noise". It is possible to apply pressured hydraulic fluid between the nut and screw to prevent their contact, but unless seals are utilized at the ends of the nut, the hydraulic fluid will flow into the environment and dirty the equipment in a manner that is unacceptable in many applications. If a seal is used at the end of the nut, such a seal which has direct contact with the lead screw and nut, itself gives rise to noise.

In accordance with the present invention, a gas is applied to the clearance space 20 between the nut and lead screw to center the axis of the nut on the axis 22 of the lead screw, to prevent direct contact of one with the other. The pressured gas is obtained from a source 24 such as a cylinder of pressured nitrogen, and is applied through an inlet 26 to a plenum chamber 28 of the nut. A radially spaced inner wall 30 of the plenum chamber has a group of narrow passages or holes 32 that lead to the clearance space 20 between the nut and lead screw, to apply pressured gas thereto.

Figures 2, 3:
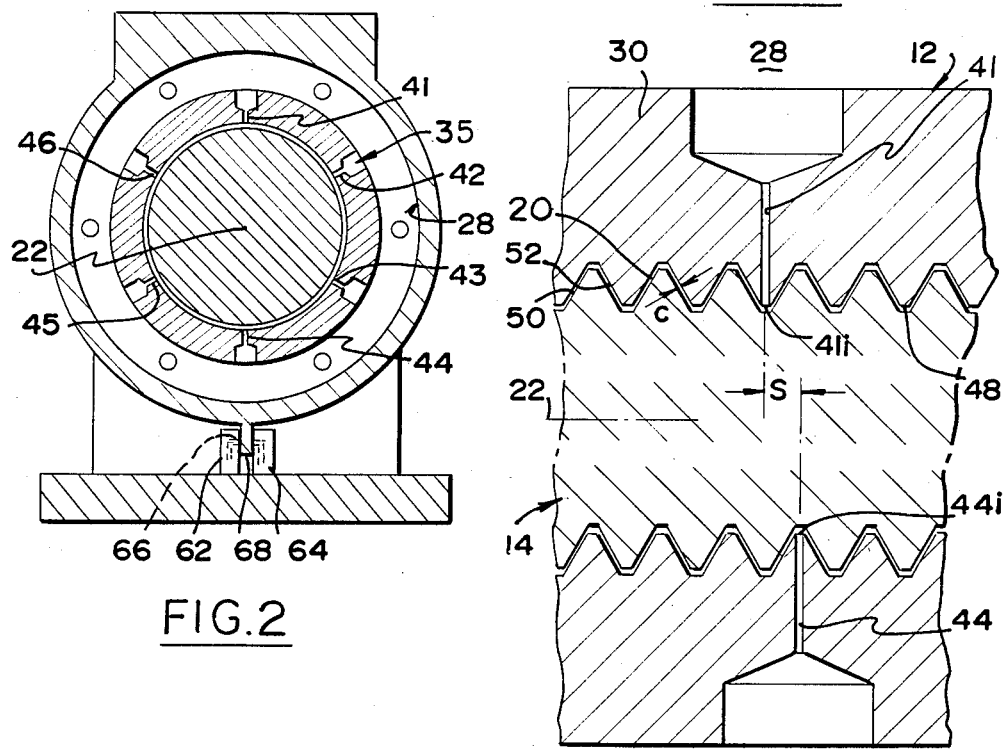
FIG. 2 is a view taken on the line 2—2 of FIG. 1.
FIG. 3 is an enlarged view of selected areas of FIG. 1.

The nut 12 is provided with two connected plenum chamber portions 34, 36 and the second portion 36 also has a group of holes 35 leading to the clearance space 20. The pressured gas applied through the holes 32, 35 moves in the axial directions indicated by arrows 37, 38 respectively, so the gas flows to the opposite ends of the nut and into the environment. Since the pressured gas is relatively inert, the addition of small amounts of it to the environment does not cause any harm. The clearance space 20 between the nut and screw is very small, so that there is a very small flow rate of gas into the environment. As shown in FIG. 2, each group of holes such as 35, includes six holes 41–46 that are circumferentially spaced about the axes of the nut and lead screw, so that the pressured gas is applied relatively uniformly around the clearance space 20. The pneumatic centering system can operate by increasing the pressure on one side of the nut when that side approaches the lead screw. In one example, the gas pressure in the plenum chamber 28 may be at 15 psi, and there may be a pressure drop through each of the holes such as 41 so that the average pressure at the opposite or inner end of each hole is about 10 psi. If the pressure at the radially inner side of each hole is 10 psi, then there is uniform pressure all around the screw.

If the nut 12 moves downwardly so that the clearance space near the inner end 41$i$ (FIG. 3) of hole 41 decreases, then this restricts the flow of air out of the hole 41. The lower flow rate of air causes the pressure at the inner end of the hole 41 to rise towards the higher pressure of 15 psi in the plenum chamber 28. Accordingly, the pressure at the inner end of the hole 41 increases towards 15 psi, so that more force is applied to the top of the nut to raise it slightly. When the nut initially moved down, the larger clearance space at the bottom hole 44 resulted in a larger flow rate of gas through that hole, so that the pressure at the inner end 44$i$ of the hole 44 decreased from 10 psi to a lower level such as 9 psi. Accordingly, the gas at 44$i$ applied less downward force to the nut 12 to allow it to rise and thereby center it.

The plenum chamber 28 extends circumferentially around the nut, and has a much larger cross section than any of the holes 41–46, of more than one hundred times as much, that the gas pressure at the radially outer ends of the holes are uniform. Two groups of holes 32, 3 5 (FIG. 1) are utilized, to provide two areas at which there is a large centering force on the nut, and to provide two axially spaced locations at which the nut is centered to thereby resist forces tending to tilt the nut. Only two groups of holes 32, 35 are provided, since there are only two directions 37, 38 for the gas to flow axially along the lead screw from each group of holes. Additional groups of holes can be provided if an additional nut portion is used which has ends that are each separately open to the environment.

As shown in FIG. 3, each of the holes such as 41 is positioned in the nut wall 30, so that the hole inner end 41i lies at the lower apex 48 of a nut thread, and therefore opens to the bottom of the screw thread. This helps provide uniformity in the distribution of the pressured gas from the inner end of each hole into the clearance space 20. Since the apex of the thread is axially shifted (by 1/80th inch for a 40 pitch thread) at locations 180° apart, the inner ends of the holes 41i and 44i are arranged so they are slightly displaced, as by the distance S along the axis 22 of the lead screw.

In one positioning apparatus that has been constructed, the lead screw 14 was of one inch diameter, and had threads 50 with a pitch of 40 threads per inch. The threads 52 of the nut had a pitch which was 0.004 inch greater than that of the lead screw. This resulted in a positive clearance C between adjacent surfaces of the nut and lead screw, of 0.0005 inch. The holes such as 41 were each constructed with a diameter of 0.005 inch. In one group of tests, gas was applied at a pressure of 15 psi at the inlet 26 of the plenum chamber, and at that pressure the nut 12 was able to support a weight of 250 grams before making contact with the lead screw 14. When pressured gas was not applied, there was a high friction that acted as a stop to prevent nut rotation relative to the screw, and therefore prevent screw rotation.

A variety of devices can be used to prevent rotation of the nut, with very little torque being applied to tend to rotate the nut. One example of a rotation-preventing device, is an air-bearing which includes a pair of pads 62, 64 (FIG. 2) that each have a hole 66 therein to apply pressured gas between the pad and a corresponding side of a flange 68 extending from one side of the nut. The screw is supported by bearings 70, which may be air bearings to reduce the possibility of noise.

During normal operation, the nut does not make contact with the lead screw at any point. The apparatus can be monitored for any such contact, by constructing at least the threaded portion of the nut and lead screw of conductive material such as metal, and measuring the resistance between the nut and screw. This is accomplished by connecting a resistance measuring device 72 between the lead screw and nut, with one terminal 74 of the device fixed to the nut 12, and the other end 76 in very low pressure sliding contact with a slip ring 76 on the screw. The gas, such as nitrogen, applied in the clearance space 20, has very high electrical resistance, and the nut normally does not make contact anywhere with the lead screw, so that there is usually a very high resistance between them, even though they are very close together. If contact is made even over a very small region between the nut and screw, then a sudden decrease in resistance will be noted on the resistance-measuring device 72.

Thus, the invention provides a low noise precision positioning apparatus, which can be utilized in the environment of delicate instruments. The apparatus includes a lead screw and nut, and a means for flowing gas under pressure between them, so that the pressured gas can flow in an axial direction to the end of the nut and out into the environment. The nut is provided with a group of holes circumferentially spaced about the nut and screw, and gas under pressure is applied through the holes to the clearance space between the nut and screw. No solid contact is maintained between the nut and screw in normal operation, and there are no seals at the ends of the nut to prevent the free outflow of the gas into the environment. Instead, inert gas is allowed to flow freely into the environment, and the amount of flow is restricted by providing a small clearance between the nut and screw. The screw and nut can be formed with electrically conductive surfaces, so that a resistance measuring device can be connected between them to note any sudden decrease in electrical resistance between them that would indicate direct contact.

Although particular embodiments of the invention have been described and illustrated herein, it is recognized that modifications and variations may readily occur to those skilled in the art and consequently, it is intended that the claims be interpreted to cover such modifications and equivalents.

What is claimed is:

1. A low noise positioning apparatus comprising:
    a lead screw having an axis extending in an axial direction;
    a nut lying about said screw;
    said screw and said nut having electrically conductive surfaces;
    means for flowing gas under pressure between said nut and said screw and in an axial direction and out of an end of said nut into the environment, and
    means for measuring the electrical resistance between said screw and said nut, whereby to enable checking for possible contact of the nut and screw.

2. A low noise positioning apparatus, comprising:
    a lead screw having an axis extending in an axial direction;
    a nut lying about said screw;
    a clearance space between said screw and said nut;
    said nut having at least 3 holes therein with the holes being circumferentially spaced about the screw to carry pressurized gas to the clearance space between the nut and screw;
    said holes each passing through a crest of a thread on said nut so as to discharge gas into the root of the thread on said screw which is complementary to said crest and;
    said holes being displaced slightly from each other in an axial direction with the spacing determined by the pitch of the thread on the nut such that each of the holes passes through the crest of the nut thread,
    whereby the nut is precisely supported in an orginal position in spaced relation with respect to the screw when a pressurized gas is passed through the holes in the nut into the clearance space between the nut and the screw with lateral displacement of the nut relative to the screw causing a pressure increase in the region where the spacing between the nut and screw is decreased with the pressure increase providing a restoring force to return the nut to its original position with respect to the screw.

3. The apparatus of claim 2 including:

a plenum chamber within said nut which communicates with said holes such that a gas supplied to the plenum chamber flows through said holes into the clearance space between the nut and the screw.

4. The apparatus of claim 2 wherein:

said nut includes at least a first and second group of holes with each group including at least 3 holes spaced circumferentially about the screw and passing through the crest of the nut thread into the root of the screw thread which is complementary to said crest;

said groups of holes being spaced axially with respect to the screw such that gas passing through said groups of holes provides support for the nut in several regions which are spaced axially in correspondence with the spacing of the groups of holes, whereby the support for the nut when pressurized gas is passed through the groups of holes provides increased resistance to tilting of the nut with respect to the axis of the screw.

5. The apparatus of claim 2 wherein:

the clearance space between said screw and said nut is on the order of 0.005 inches in permitting the free outflow of pressurized gas in the clearance space at a rate which is limited by the distance between the nut and the screw.

* * * * *